(Model.)

3 Sheets—Sheet 1.

J. W. GREGORY.
BIRD CAGE.

No. 300,249. Patented June 10, 1884.

WITNESSES
M. Johnson
H. H. Taylor

Inventor
James W. Gregory

Attorney (Model.)

J. W. GREGORY.
BIRD CAGE.

No. 300,249. Patented June 10, 1884.

WITNESSES

Inventor
James W. Gregory
Attorney

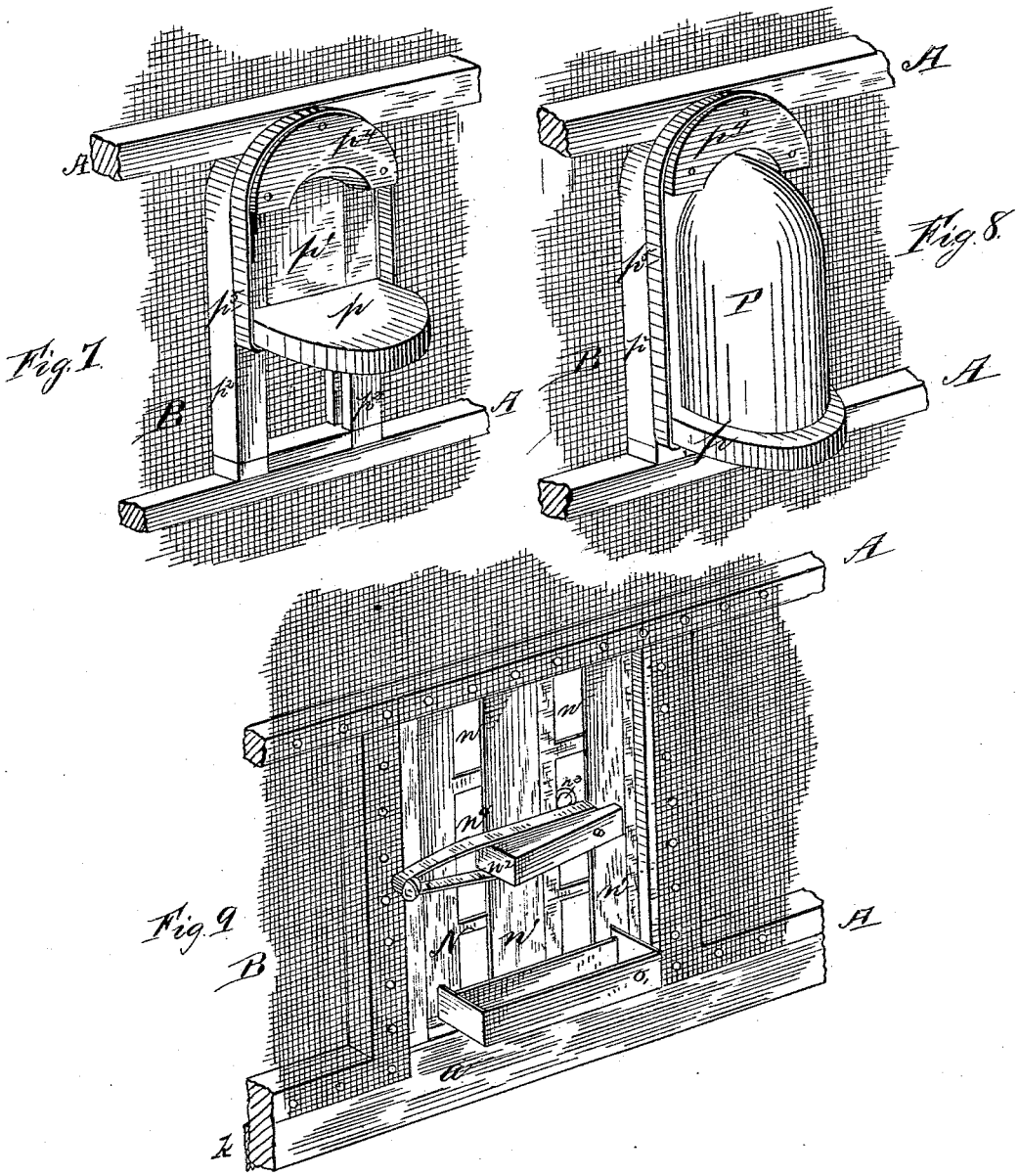

UNITED STATES PATENT OFFICE.

JAMES W. GREGORY, OF AMES, IOWA.

BIRD-CAGE.

SPECIFICATION forming part of Letters Patent No. 300,249, dated June 10, 1884.

Application filed April 26, 1883. (Model.)

*To all whom it may concern:*

Be it known that I, JAMES W. GREGORY, a citizen of the United States of America, residing at Ames, in the county of Story and State of Iowa, have invented certain new and useful Improvements in Bird-Cages; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The object of this invention is to provide a bird-cage in which the encaged bird or birds will be protected against cats, rats, birds of prey, and other enemies; from which the birds will be prevented from throwing water, food, or litter; which may be readily cleansed without being removed from its original position; into which food and water may be readily supplied without danger of allowing the birds to escape, and which is not liable to become foul, broken, or out of repair.

With these objects in view, the invention consists in certain novel constructions and combinations of devices, which will be hereinafter particularly described, and pointed out in the appended claims.

Figure 1:
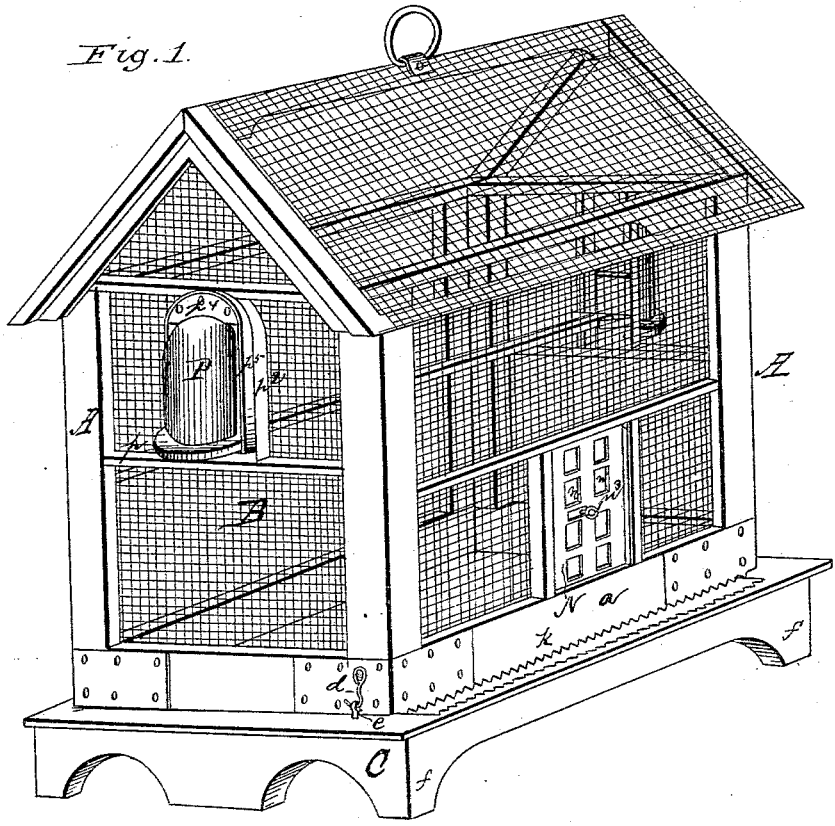
Figure 2:
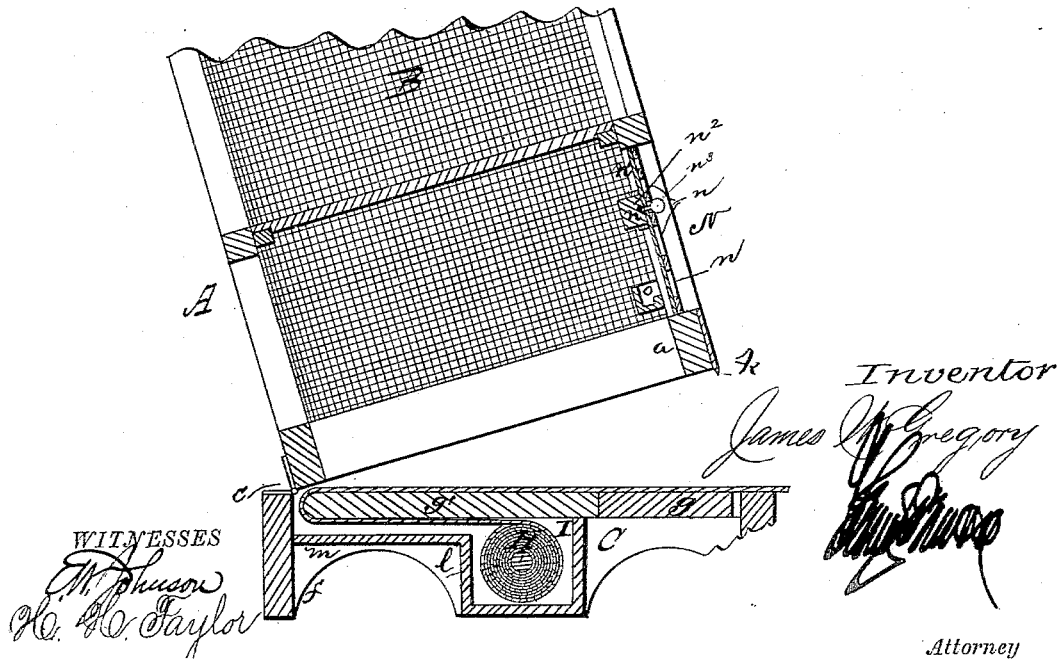
Figure 3:
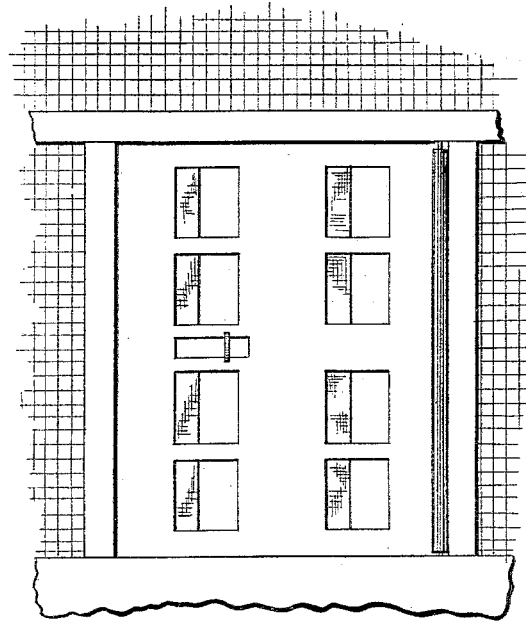
Figure 4:
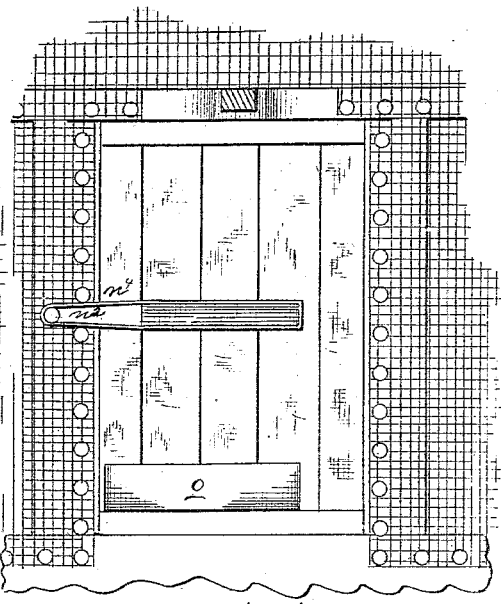
Figure 5:
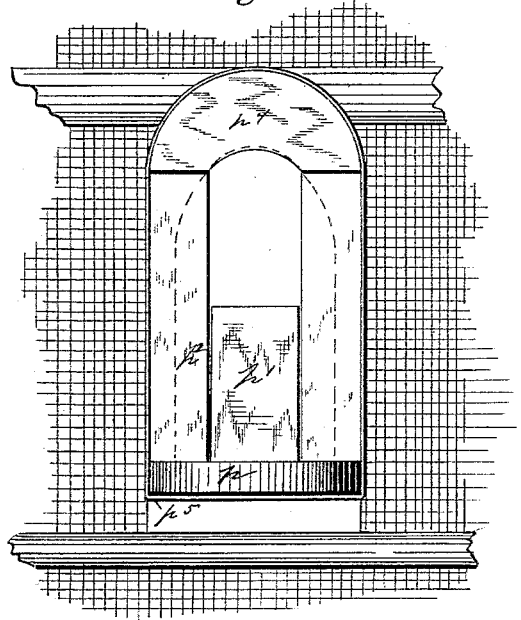
Figure 6:
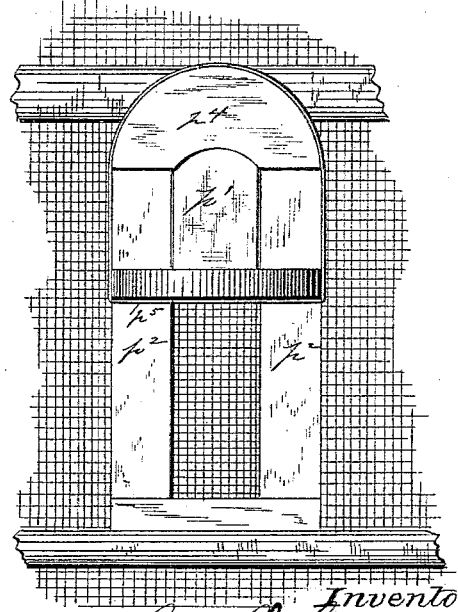

In the accompanying drawings, Figure 1 is a perspective view of a bird-cage constructed according to my invention. Fig. 2 is a transverse vertical section of the lower part of the cage and its base, the cage being raised at its front edge. Fig. 3 is a front view of the door with its slides partly open. Fig. 4 is a rear view of the door with the trough attached thereto. Fig. 5 is an outside view of the feed-cup support, with the position of the cup indicated in dotted lines. Fig. 6 is a view of the feed-cup support with the cup removed and the shelf and slide elevated. Fig. 7 is a perspective view of the feed-cup support, showing the opening closed, the cup being removed. Fig. 8 is a perspective view of the feed-cup in place, and Fig. 9 is a perspective view of the inner side of the door, showing the slide partly open.

The letter A indicates the frame-work, consisting of the usual corner-posts, and horizontal bars in the present instance, though I do not confine myself to an angular cage.

To the inner side of the frame-work of the main body of the cage is attached the reticulated wire-cloth B, which is stretched along the sides and ends in a proper manner to inclose the inner space. The roof may be of any suitable shape beside that shown in the drawings, and needs no particular description. I have shown the wire-cloth of the roof on the outside of its frame-work; but the main body of the cage has the wire-cloth on the inside of its frame-work, in order that thereby the birds may be prevented from depositing trash and droppings upon the horizontal bars.

The superstructure of the cage has its rear lower edge hinged to a base, C, as shown at $c$, and at its ends it is provided with hooks $d$, to engage staples or eyes $e$ projecting from the end margins of the base. The base C is supported by suitable legs, $f$, and is an open frame, in the top of which is located the floor of the cage, this floor consisting, preferably, of two sections, $g\ g'$, or the floor might be made of one piece, if desired. The floor rests upon suitable shoulders formed on the inner sides of the end pieces of the base, and between the rear edge of the rear section, $g'$, and the rear side of the base is left a slight intervening space. Under this section $g'$ of the floor is arranged a roller, H, which has its ends journaled in the end pieces of the base, and which carries a roll, I, of paper or other suitable material, adapted to cover or carpet the floor of the cage. In placing the covering material upon the floor the end of the roll I is passed up behind the rear edge of the floor, and is then drawn forward to the front, where it may be held by closing the cage-frame down upon it. The front bottom bar, $a$, of the cage-frame is provided with a serrated plate, the downwardly-projecting teeth $k$ of which may project into a narrow space left between the front edge of the floor and the base-frame. When the bar $a$ is pressed down on the floor-covering material, these teeth cut said material and weaken it, so that any outwardly-projecting portion may be neatly torn off.

I prefer to inclose the roll of floor-covering material in a trough-like compartment, as shown at $l$, and also to protect that portion of the covering material which passes under the floor by means of a guard board or plate, $m$.

It will be seen that when the floor-covering becomes foul it may be readily removed by simply raising the front edge of the cage slightly and drawing forward a fresh portion from the roll I over the floor, and when the cage is then pressed down again the foul portion may be torn off and thrown away.

The door N is hinged in a door-frame in the usual manner, and is provided with openings $n$, behind which are arranged slides $n'$, the ends of which move in suitable guides formed at the upper and lower edges of the door. These slides are connected to a lug, $n^2$, on their inner surfaces, and from one of the slides a suitable operating-pin, $n^3$, projects outwardly through a slot in the door, so that the slides may be moved laterally to open the openings $n$. To the side of the door-frame to which the door is hinged is attached one end of a spring, $n^4$, the other end of which is connected to the lug $n^2$ on the door-slides, and the tension of this spring is so regulated that while it draws the slides in position to close the openings $n$, it also acts as a door-spring to keep the door closed. Near the lower edge of the inner side of the door is secured a trough, $o$, and the main purpose of the slides $n'$ is to afford access to this trough for the purpose of filling the same from the outside, and when the slides are closed the bird is prevented from splashing the material which may be placed therein outward.

At each end of the cage, as shown in the present instance, is arranged a feed-cup, P, which may be readily removed and replaced without leaving an opening through which the bird could escape. The feed-cup rests upon a shelf, $p$, secured to a slide, $p'$, which plays between two guide-bars, $p^2$, arranged against the outer surface of the wire-cloth wall of the cage, a sufficient portion of the cloth being cut away between these guides to allow the bird to insert his head into the feed-cup. At the upper ends of the guide-bars $p^2$ is arranged an outwardly-projecting cleat, $p^4$, having its lower edge inwardly beveled to take over the similarly-beveled upper end of the feed-cup. To the cleat $p^4$ are secured springs $p^5$, which are also attached to the shelf $p$, and when the feed-cup is not in place these springs will raise the shelf and the slide $p'$, to which it is attached, so that the latter will close the opening in the wire-cloth between the guide-bars, so that the bird cannot escape.

In order to replace the feed-cup after filling, its bottom is to be set upon the shelf with its opening turned inwardly, and then by pressing downward the slide $p'$ and the shelf are caused to descend, and the upper end of the cup may be brought under the cleat $p^4$, and the springs will draw it up snugly under and against the cleat, with its opening coinciding with the opening between the guide-bars which has been uncovered by the descent of the slide and shelf. In the present instance I have shown an elastic band passing over the cleat $p^4$ and under the shelf $p$, its two sides forming the springs which raise the shelf; but it will be readily understood that any other convenient form of spring may be used which will raise the slide when the cup is to be removed.

Having now fully described my invention, what I claim is—

1. The combination, with the front lower edge of the cage, of the series of teeth or serrations adapted to perforate the floor-covering material, substantially as described.

2. The combination, with the door having a trough secured thereto, and suitable opening or openings formed therein for access to said trough, of the slides arranged to open and close said opening or openings, substantially as described.

3. The combination, with the door and the slides secured thereto, of the spring having one end fixed to a permanent support and the other end secured to the slides, said spring being arranged to close the door and draw the slides, substantially as described.

4. In combination with a bird-cage, the guide-bars $p^2$, for the feed-cup slide, secured to the wall of the cage, and having an opening formed between them in said wall, of a slide arranged to play between said bars, and a shelf projecting from the slide for the support of the feed-cup, and a recessed cleat, $p^4$, for engaging with the upper end of the feed-cup, and a spring attached to the cleat and shelf, substantially as shown, and for the purpose set forth.

In testimony whereof I affix my signature in presence of two witnesses.

JAMES W. GREGORY.

Witnesses:
GEO. A. UNDERWOOD,
E. R. CHAMBERLAIN.